R. E. CAMPBELL.
VALVE.
APPLICATION FILED JAN. 11, 1919.

1,330,429.

Patented Feb. 10, 1920.

INVENTOR
Robert E. Campbell
BY
Strong & Townsend
ATTORNEYS

UNITED STATES PATENT OFFICE.

ROBERT E. CAMPBELL, OF BERKELEY, CALIFORNIA.

VALVE.

1,330,429.

Specification of Letters Patent.   Patented Feb. 10, 1920.

Application filed January 11, 1919. Serial No. 270,738.

*To all whom it may concern:*

Be it known that I, ROBERT E. CAMPBELL, citizen of the United States, residing at Berkeley, in the county of Alameda and State of California, have invented new and useful Improvements in Valves, of which the following is a specification.

This invention relates to a valve.

One of the objects of the present invention is to provide a simple, cheaply manufactured valve which is particularly adapted for use where hot or boiling water is required, and which is so constructed that soft packing of any nature may be entirely eliminated.

Another object of the invention is to provide a spherical valve having a central passage formed therein and a stem for turning the valve to bring the central passage into or out of register with a longitudinal passage extending through the valve casing.

Another object of the invention is to provide a removable and adjustable non-metallic valve seat, a holder therefor, a diaphragm whereby the valve seat and holder may be packed against leakage, and an extension on the holder actuated by the diaphragm so that pressure may be exerted to hold the valve seat in tight engagement with the valve.

Further objects will hereinafter appear.

The invention consists of the parts and the construction and combination of parts as hereinafter more fully described and claimed, having reference to the accompanying drawings, in which—

Figure 1:
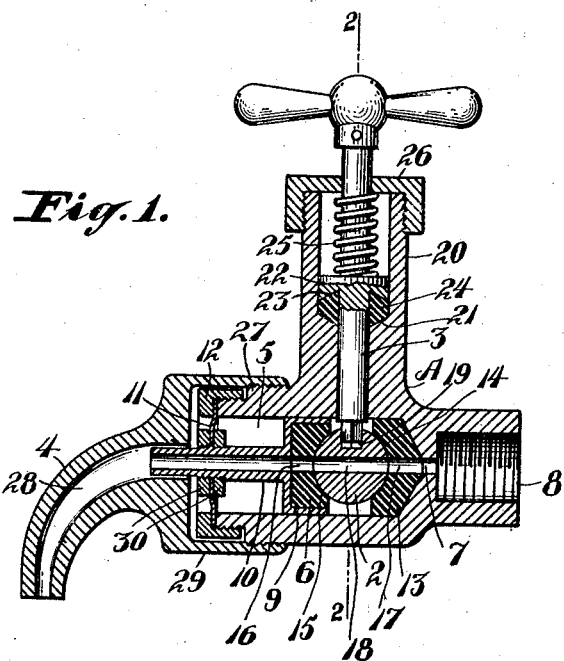
Figure 1 is a central, vertical section through the valve.
Figure 2:
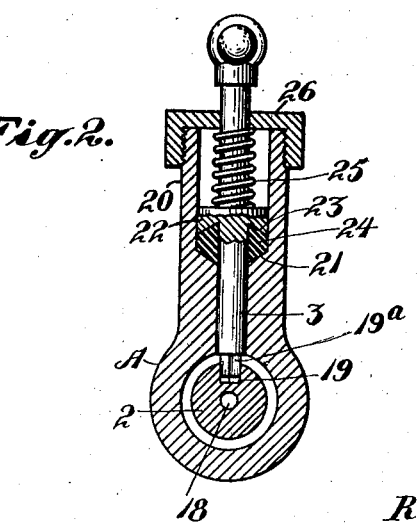
Fig. 2 is a vertical cross section of the same taken on the line 2—2 of Fig. 1.

Referring to the drawings in detail: A indicates a valve casing constructed of brass or any other suitable material, 2 the valve proper, 3 the stem by which it is turned, and 4 the spout of the valve.

Formed interiorly of the casing is a longitudinally extending passage one end of which is enlarged as at 5 to permit the insertion of a non-metallic member 6. The opposite end of the passage is contracted as at 7 and communicates with a threaded extension 8 which permits the valve casing to be screwed on the end of a pipe or other suitable fitting. The non-metallic member 6 is in this instance supported by a holder 9 which is provided with a sleeve-like extension 10. This extension is threaded at its outer end and passes through a diaphragm 11 which is secured on the end of the casing by means of a screw cap 12. The diaphragm is provided for two purposes. First, it serves as a packing to prevent leakage around the holder 9 and the non-metallic member carried thereby, and secondly it serves as a means for exerting pressure on the holder and the non-metallic member as will hereinafter be described.

Suitably secured in the inner end of the enlarged longitudinal passage 5 is a non-metallic member 13 in the forward face of which is formed a valve seat 14. Formed in the opposed face of the non-metallic member 6 is also a valve seat 15, and formed in both non-metallic members 6 and 13 are central passages 16 and 17 which are disposed in alinement with the passage 7 and the sleeve-like extension 10. The valve proper is preferably spherical in shape as here shown and is provided with a central passage 18 and a recess 19 to permit it to be turned by means of the valve stem 3; the lower end of the valve stem being provided with a square shank extension $19^a$ which enters the recess, thus permitting the valve and stem to be made in two separate parts and also permitting turning movement of the stem to be transmitted to the valve when it is desired to bring the passage 18 into or out of alinement with the passages 16 and 17.

The stem 3 extends through a threaded projection 20 formed on the casing. Formed interiorly of said extension is a seat 21, and formed on the stem 3 is a collar 22 on the lower face of which is formed a seat 23. Interposed between the seats 21 and 23 is a hard packing ring 24 constructed of vulcanized rubber, fiber or other suitable material. This packing member is always held in tight engagement with the faces 21 and 23 by means of a spring 25 which is interposed between the collar 22 and a screw cap 26. Any leakage upwardly around the stem is in this manner obviated and it can also be seen that adjustment or tightening of the packing is obviated as the spring 25 will automatically take up any wear that may take place.

Formed on the forward end of the casing is a threaded portion 27. This is provided for the reception of the spout 4 and thus permits the spout to be screwed on the casing and to be turned and secured in any position desired. Formed within the spout is a central discharge passage 28. The upper end of this passage is in alinement with the sleeve-like extension 10 and is sufficiently large to permit the forward end of said sleeve to enter a considerable distance. This is of considerable importance as it permits the water passing through the valve to discharge into the passage 28, thus relieving the diaphragm 11 of back pressure and furthermore preventing any tendency for leakage through the threaded portion 27. The upper end of the spout is furthermore enlarged as shown at 29 to permit it to inclose the clamping nut 12, thereby affording easy access to said nut and materially increasing the general appearance of the valve as a whole.

In actual operation when water is passing through the valve it is necessary that it assume the position shown in Fig. 1. This water if very hot will naturally cause an expansion not only in the casing but also the valve proper and the members engaging the same. Such expansion will in the present instance not cause any binding action, nor will it cause excessive wear as the valve seat member 6 engaging one side of the valve is flexibly supported with relation thereto, due to the provision of the diaphragm 11, the pressure exerted by said diaphragm being sufficient to maintain a tight joint between the valve and the valve seats whether the valve is cold or hot, thereby preventing leakage due to variation in expansion or due to wear. Any excess wear taking place may in this instance be taken up by a pair of nuts 30 arranged one on each side of the diaphragm. These nuts serve as a packing between the diaphragm and the sleeve extension 10 and they also serve as a means for adjusting the position of the valve seat member 6 or the holder supporting the same.

The life of a valve constructed as here shown should be practically indefinite as the only members subject to wear, that is the valve seat members 6 and 13, may be adjusted from time to time to take up wear, due to the provision of the nuts 30, or they may be entirely removed and renewed if excessively worn. Leakage should also be prevented as the diaphragm automatically maintains the tension or frictional contact required and binding action due to expansion is also prevented as the flexibility of the diaphragm is sufficient to take care of any expansion that may take place.

While a more or less specific design is here shown I wish it understood that this may be varied to suit various installations and uses. Furthermore, that the materials and finish of the several parts employed may be such as the experience and judgment of the manufacturer may dictate.

Having thus described my invention, what I claim and desire to secure by Letters Patent is—

1. A valve comprising a casing having a longitudinal passage formed therein, a valve turnably mounted in said passage, a valve seat member movable in the passage and engageable with the valve, a spring diaphragm mounted in the passage independently of the valve seat member, and means for transmitting the tension of said diaphragm to the movable valve seat member to permit said valve seat member to exert a constant pressure on the valve.

2. A valve comprising a casing, a fixed and a movable valve seat member within the casing, a spherical valve interposed between said valve seat members and engaging the same, a spring diaphragm in the casing, mounted independently of the valve seat members and means for transmitting the tension of said diaphragm to the movable valve seat member to permit said valve seat member to exert a constant pressure on the valve.

3. A valve comprising a casing, a fixed and a movable valve seat member within the casing, a spherical valve interposed between said valve seat members and engaging the same, a diaphragm in the casing, and an extension on the movable valve seat extending through the diaphragm and adjustable with relation thereto.

4. A valve comprising a casing having a longitudinal passage formed therein, a valve turnably mounted in said passage, a valve seat member movable in the passage and engageable with the valve, a spring diaphragm mounted in the passage independently of the valve seat member, means for transmitting the tension of said diaphragm to the movable valve seat member to permit said valve seat member to exert a constant pressure on the valve, said means comprising an extension on the movable valve seat member, said extension passing through the diaphragm and adjustably secured therein, and a central passage formed in the valve seat member and extension formed thereon.

5. A valve comprising a casing having a central longitudinal passage extending therethrough, a spherical valve within the casing and disposed in said longitudinal passage, a stationary valve seat member in the passage engaging one side of the valve, a movable valve seat member in the passage engaging the opposite side of the valve, a diaphragm forming a closure for one end of the longitudinal passage, and a hollow extension on the movable valve seat member passing through said diaphragm, and adjustably secured therein.

6. A valve comprising a casing having a central longitudinal passage extending therethrough, a spherical valve within the casing and disposed in said longitudinal passage, a stationary valve seat member in the passage engaging one side of the valve, a movable valve seat member in the passage engaging the opposite side of the valve, a diaphragm forming a closure for one end of the longitudinal passage, a hollow extension on the movable valve seat member passing through said diaphragm, and means for adjusting the position of the movable valve and the extension carried thereby with relation to the diaphragm.

7. A valve comprising a casing having a central longitudinal passage extending therethrough, a spherical valve within the casing and disposed in said longitudinal passage, a stationary valve seat member in the passage engaging one side of the valve, a movable seat member in the passage engaging the opposite side of the valve, a diaphragm forming a closure for one end of the longitudinal passage, a hollow extension on the movable valve seat member passing through said diaphragm, means for turning the spherical valve, a central passage formed in the spherical valve, a central passage formed in the valve seat members and in the extension carried by the movable valve seat member, said central passage in the spherical valve adapted to aline with said passages when turned to a predetermined position, and means for adjusting the position of the valve seat member extension longitudinally with relation to the diaphragm.

8. A valve comprising a casing having a central longitudinal passage extending therethrough, a spherical valve within the casing and disposed in said longitudinal passage, a stationary valve seat member in the passage engaging one side of the valve, a movable valve seat member in the passage engaging the opposite side of the valve, a holder surrounding the movable valve seat member, a sleeve-like extension on said holder, a diaphragm forming a closure for one end of the longitudinal passage through which the sleeve-like extension passes, and means for forming a seal between the diaphragm and the sleeve member passing therethrough, said means also permitting longitudinal adjustment of the sleeve member.

9. A valve comprising a casing having a central longitudinal passage extending therethrough, a spherical valve within the casing and disposed in said longitudinal passage, a stationary valve seat member in the passage engaging one side of the valve, a movable valve seat member in the passage engaging the opposite side of the valve, a holder surrounding the movable valve seat member, a sleeve-like extension on said holder, a diaphragm forming a closure for one end of the longitudinal passage through which the sleeve-like extension passes, means for forming a seal between the diaphragm and the sleeve member passing therethrough, said means also permitting longitudinal adjustment of the sleeve member, a central passage formed in the spherical valve, means for turning the valve and a central passage formed in the valve seat members and in the sleeve-like extension, said passages adapted to aline with the valve passage when the valve assumes a predetermined position.

10. A valve comprising a casing having a central longitudinal passage extending therethrough, a spherical valve within the casing and disposed in said longitudinal passage, a stationary valve seat member in the passage engaging one side of the valve, a movable valve seat member in the passage engaging the opposite side of the valve, a holder surrounding the movable valve seat member, a sleeve-like extension on said holder, a diaphragm forming a closure for one end of the longitudinal passage through which the sleeve-like extension passes, means for forming a seal between the diaphragm and the sleeve member passing therethrough, said means also permitting longitudinal adjustment of the sleeve member, a central passage formed in the spherical valve, means for turning the valve, a central passage formed in the valve seat members and in the sleeve-like extension, said passages adapted to aline with the valve passage when the valve assumes a predetermined position, a spout adapted to be secured on one end of the casing and to inclose the diaphragm and the sleeve-like extension, and a central discharge passage in said spout adapted to receive the forward end of the sleeve-like extension.

11. A valve comprising a casing, a fixed and a movable valve seat member within the casing, a spherical valve interposed between said valve seat members and engaging the same, a tubular extension formed on the movable valve seat member, a diaphragm having its periphery fixed in the casing independently of the movable valve seat member, a central opening in the diaphragm through which the tubular member extends, and nuts clamping the diaphragm adjustably upon the tubular extension.

12. A valve comprising a casing having a central longitudinal passage extending therethrough, a spherical valve within the casing disposed in the longitudinal passage, a stationary valve seat member in the passage engaging one side of the valve, a movable valve seat member mounted in the longitudinal passage, engaging the opposite side of the valve, a diaphragm forming a closure for one end of the longitudinal passage, means for securing the diaphragm against end-wise movement with relation to the casing and the longitudinal passage, a tubular extension formed on the valve seat member passing through the center of the diaphragm, and means for adjustably securing the diaphragm to said tubular extension.

In testimony whereof I have hereunto set my hand in the presence of two subscribing witnesses.

ROBERT E. CAMPBELL.

Witnesses:
 LAURA JACKSON,
 LURA M. COWAN.